(12) United States Patent
Radu et al.

(10) Patent No.: US 9,179,772 B1
(45) Date of Patent: Nov. 10, 2015

(54) SLIDING-TUBE ADJUSTABLE SUPPORT LEG

(71) Applicants: Dorin Radu, Toronto (CA); Bhola Bhattacharya, Toronto (CA); Alexei Nalbandyan, Mississauga (CA); Don Chevarie, Oshawa (CA); Drago Skrilec, Ajax (CA)

(72) Inventors: Dorin Radu, Toronto (CA); Bhola Bhattacharya, Toronto (CA); Alexei Nalbandyan, Mississauga (CA); Don Chevarie, Oshawa (CA); Drago Skrilec, Ajax (CA)

(73) Assignee: NELSON industrial inc., Pickering, ON (CA)

( * ) Notice: Subject to any disclaimer, the term of this patent is extended or adjusted under 35 U.S.C. 154(b) by 0 days.

(21) Appl. No.: 14/481,425

(22) Filed: Sep. 9, 2014

(51) Int. Cl.
| | |
|---|---|
| *F16M 11/00* | (2006.01) |
| *A47B 91/02* | (2006.01) |
| *A47B 91/16* | (2006.01) |
| *F16B 7/10* | (2006.01) |
| *F16B 7/14* | (2006.01) |

(52) U.S. Cl.
CPC .............. *A47B 91/02* (2013.01); *A47B 91/16* (2013.01); *F16B 7/10* (2013.01); *F16B 7/1427* (2013.01)

(58) Field of Classification Search
CPC .......... A47B 91/02; A47B 91/16; F16B 7/10; F16B 7/1427; F16M 11/046
See application file for complete search history.

(56) References Cited

U.S. PATENT DOCUMENTS

| | | | | | |
|---|---|---|---|---|---|
| 2,432,059 | A | * | 12/1947 | Zipser ........................... | 403/350 |
| 3,469,870 | A | * | 9/1969 | Barkus .......................... | 403/107 |
| 4,329,076 | A | * | 5/1982 | Coreth ........................ | 403/109.8 |
| 5,259,821 | A | * | 11/1993 | Bryant .......................... | 474/136 |
| 5,460,458 | A | * | 10/1995 | Caceres ..................... | 403/109.5 |

* cited by examiner

*Primary Examiner* — Amy Sterling
(74) *Attorney, Agent, or Firm* — Elias Borges

(57) ABSTRACT

An adjustable support leg is disclosed having an elongated outer member having a pair of elongated parallel walls separated by a space, the elongated outer member having a bottom end and an open top end. An elongated inner member is contained within the outer member. A series of horizontal slots are formed on each of the parallel walls. The inner member has upper and lower cam members. The cam members each consist of a flat member having first and second pairs of opposite sides. The first opposite sides project outwardly so as to engage the slots when the elongated inner member is rotated into a first position. The second opposite sides are configured to clear the elongated parallel walls such that the cams do not engage the slots when the elongated inner member is rotated out of the first position.

5 Claims, 2 Drawing Sheets

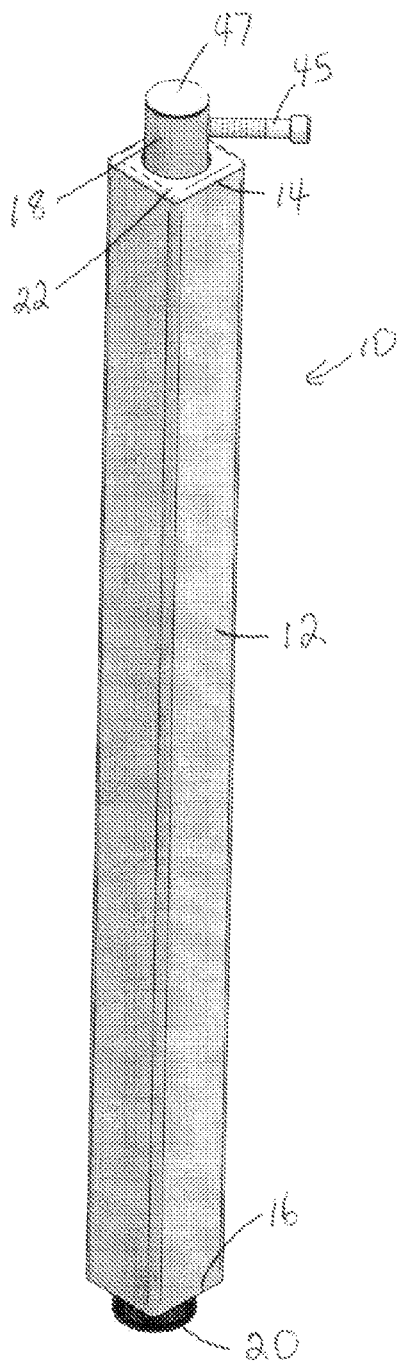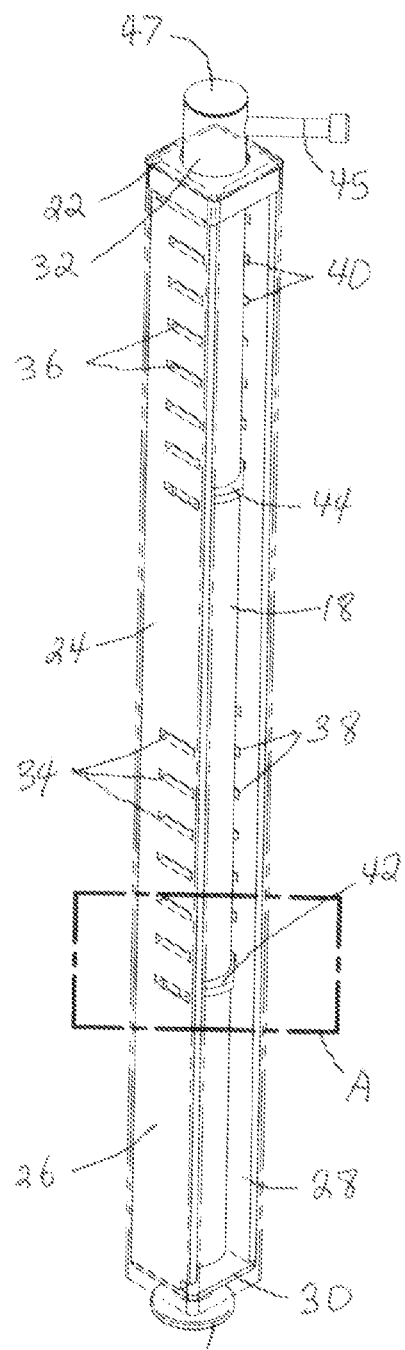

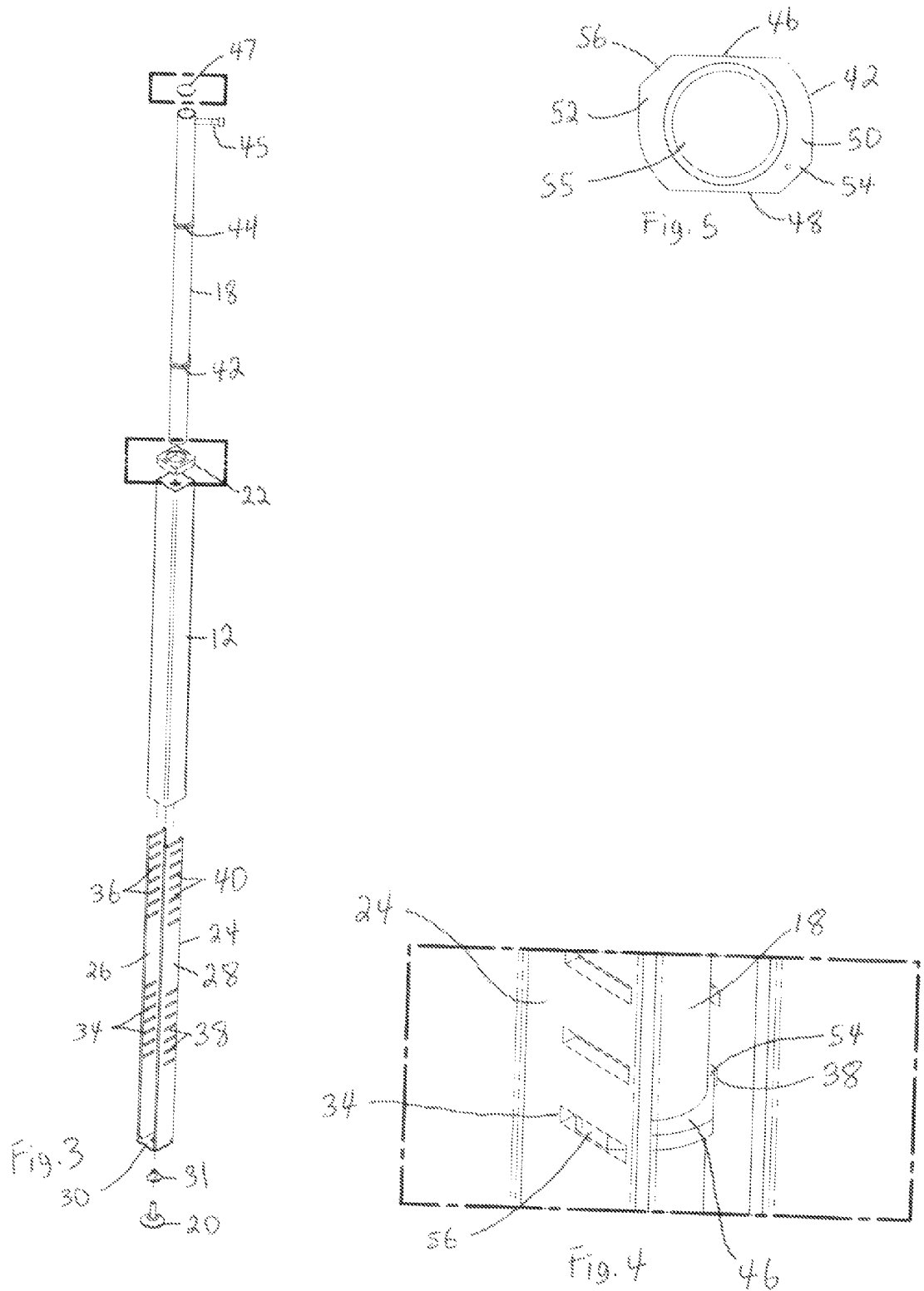

SLIDING-TUBE ADJUSTABLE SUPPORT LEG

FIELD OF THE INVENTION

The invention relates to applications where an adjustable leg is required to support a structure (stand, bar, table, desk, cabinet, shelving, etc.) positioned at various heights.

BACKGROUND OF THE INVENTION

There are many circumstances where an existing working surface or a storage unit is required to be positioned at a specific height, in accordance to the practical use, esthetical preference or the ergonomic considerations. There are also multiple solutions already in use for such requirements. The majority of the current solutions utilize a system of tubes of the same shape and various dimensions, allowing one to slide inside the other and being typically secured in the desired position with a metal pin protruding through pre-drilled holes in both tubes.

The existing solutions are limited in terms of design options and require more interdependent components to interact in the process of height adjustment. They also present alignment challenges and typically require multiple people or complicated lifting devices to perform the adjustment operation.

The present invention provides an elegant solution that minimizes the number of moveable components (only two), creates an esthetically pleasing assembly and makes the adjustment extremely easy (no additional tools required) and user friendly (very intuitive).

SUMMARY OF THE INVENTION

In accordance with one aspect of the present invention, there is provided a support leg for supporting an object, the support leg being adjustable and telescoping. The support leg includes an elongated outer member having a pair of elongated parallel walls separated by a space, the elongated outer member having a bottom end and an open top end. An elongated inner member is contained within the space of the elongated outer member, the elongated inner member having opposite top and bottom ends. The elongated inner member is positioned between the pair of elongated parallel walls, the top end of the elongated inner member held above the open top end of the elongated outer member, the bottom end of the elongated inner member positioned between the open top end and the bottom end of the elongated outer member. The pair of elongated parallel walls have a series of slots which are horizontally aligned so that the slots of one of the parallel walls is horizontally aligned with corresponding slots on the other of the parallel walls. The elongated inner member has upper and lower cam members rigidly attached thereto between the top and bottom ends of the inner member. The cam members each consist of a flat member having a central portion through which the elongated inner member passes and first and second pairs of opposite sides. The first opposite sides project from either side of the central portion so as to engage the slots when the elongated inner member is rotated into a first position. The second opposite sides are configured to clear the elongated parallel walls such that the cams do not engage the slots when the elongated inner member is rotated into a second position.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 1 is a perspective view of a support leg made in accordance with the present invention.

FIG. 2 is a perspective view of the support leg shown in FIG. 1 showing inner details of the support leg.

FIG. 3 is an exploded view of the support leg shown in FIG. 1.

FIG. 4 is a detailed view of portion A of FIG. 2.

FIG. 5 is a top view of one of the cam members used in the support leg made in accordance with the present invention.

In the drawings like characters of reference indicate corresponding parts in the different figures.

DETAILED DESCRIPTION OF THE INVENTION

The present invention is an improvement to existing solutions in terms of functionality, ease of use and esthetical appearance. The described sliding tube system is intended to serve as an adjustable leg assembly incorporated into the structure of a table frame, or similar constructions, where legs need to be adjusted incrementally, but locked in position at a certain, predetermined height to support a horizontal work surface, or a structure with a specific functional purpose. It could also be construed as a controlled tilting mechanism, when one side of the supported structure needs to be positioned at either, higher or lower level (i.e. a display unit, a drawing board, etc.).

The same concept could be used for single stands (i.e. flag bearer), double leg applications (i.e. hanging bars in commercial spaces) or any other use where esthetic and functional considerations require a telescopic adjustable system that offers structural integrity in a concealed manner.

Referring to FIG. 1, an adjustable leg made in accordance with the present invention is shown generally as item 10 as a completely assembled item, consisting of 11 constructive elements. The assembly could be made either from stainless steel—in which case no additional coating is required, or from mild steel—in which case a layer of paint is recommended on all visible surfaces, with the inner tube fully extended. Adjustable leg 10 has and outer tube, or sheathing, 12 which consists of an elongated tube having opposite ends 14 and 16. Preferably sheathing 12 has a square or rectangular cross sectional profile, although theoretically any shaped profile could be used for the sheathing. Sheathing 12 has opposite ends 14 and 16. Elongated member 18 is contained within sheathing 12 and partially projects out of end 14. A foot 20 is provided on adjustable leg 10 and projects out of bottom end 16 of sheathing 12.

Referring now to FIGS. 2 and 3, elongated member 18 is contained within an outer elongated member 24 which consists of a pair of elongated parallel plates or walls 26 and 28 which are placed in a vertical orientation. Elongated parallel walls 26 and 28 are joined together by horizontal plate 30 at the lower ends of elongated parallel walls 26 and 28 by means known generally in the art, such as by welding. A weld nut 31 (FIG. 3) is welded to the underside of base plate 30 and provides a means for attaching foot 20. Alternatively, a caster could be fitted to plate 30 by means known generally in the art.

At the upper ends of elongated parallel walls 26 and 28, the parallel walls may be held together by cap 22 when the unit is assembled (i.e. with sheathing 12 in place). Cap 22 has an aperture through which end 32 of elongated member 18 projects. A lower and upper series of horizontal slots, items 34 and 36 respectively, are formed on parallel wall 26. Likewise, a corresponding lower and upper series of horizontal slots, items 38 and 40 respectively, are formed on parallel wall 28. Slots 34 are horizontally aligned with slots 38 and slots 36 are horizontally aligned with slots 40. Elongated member 18 provides the functional role of vertical adjustability. Elongated member 18 is provided with lower cam 42 and upper cam 44. Cams 42 and 44 are identical and they have an asymmetrical geometry. Cam 42 has horizontal projections which are shaped to engage slots 34 and 38 when elongated member 18 is rotated into a first position (i.e. a locked position). Likewise, cam 44 has horizontal projections which are shaped to engage slots 36 and 40. Cams 42 and 44 are rigidly mounted to elongated member 18 and aligned with each other such that rotating elongated member 18 into its first position causes the cams 42 and 44 to engage their respective slots and lock elongated member 18 to elongated outer member 24 such that the elongated member 18 cannot move up or down relative to outer member 24.

At the upper end, elongated member 18 is preferably an elongated cylindrical tube which is provided with a means for attaching a support bolt 45 thereto, which could be used to connect to any adjacent structure. Optionally, elongated member 18 could be terminated with an upper cap 47 welded or simply snapped in, which will close the inside cavity of the tube—for esthetical reasons, and could take some static load—transferred from the supported structure. Vibration potentially transmitted from the applied load could be reduced with a rubber pad installed on the upper cap.

At the joint level between the round profile of the inner tube and the square shape of the outer tube the section is plugged with a middle cap 22 which provides for a smooth transition and ensures the centered alignment between the two welded subassemblies.

As best seen in FIG. 5, cam 42 has opposite sides 46 and 48 and opposite sides 50 and 52. Opposite sides 50 and 52 have projections 54 and 56 which project outwardly away from central portion 55. Sides 46 and 48 do not project very far away from central portion 55. As best seen in FIG. 4, cam 46 is rigidly mounted when elongated member 18 is placed into its first position, projections 56 and 54 engage slots 34 and 38, respectively, and the cam vertically locks elongated member 18 to elongated outer member 24.

The length of the inner tube is calculated such that, in the lowest position, the tube does not sink below the level of the plug-in cap. The method of adjustment is extremely simple and requires no use of additional tools. The action required also follows a simple technical principle, according to which a tying assembly disengages when the moving element is turned counter-clockwise, and reengages when turned clockwise. When repositioning is required, the upper structure resting on the leg is detached by untying the connecting bolt 45. To disengage, the round tube (elongated member 18) is rotated by hand, counter-clockwise. Then, the tube could be moved vertically until it reaches the desired height, as pre-set by the location of the slots. It is evident that the number of slots (grouped into one or multiple segments throughout the length of the vertical plates) correlates with the number of adjustable increments the application is intended to provide.

Once in the desired position, the tube is rotated clockwise, the cams engage into the slots—preventing any further vertical movement. The rotation angle is limited by the cam stopping into the outer tube's wall. At this point the adjusted leg is situated in the locked position and ready to be reconnected with the supported structure. After performing the same operation on all the adjustable legs, the structure resting on them is reattached and secured in place by retying the bolts.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims Therefore, what is claimed is:

1. A support leg for supporting an object, the support leg comprising:
   a. An elongated outer member having a pair of elongated parallel walls separated by a space, the elongated outer member having a bottom end and an open top end;
   b. An elongated inner member contained within the space of the elongated outer member, the elongated inner member having opposite top and bottom ends, the elongated inner member positioned between the pair of elongated parallel walls, the top end of the elongated inner member held above the open top end of the elongated outer member, the bottom end of the elongated inner member positioned between the open top end and the bottom end of the elongated outer member;
   c. The pair of elongated parallel walls having a series of slots which are horizontally aligned so that the slots of one of the parallel walls is horizontally aligned with corresponding slots on the other of the parallel walls;
   d. The elongated inner member having upper and lower cam members rigidly attached thereto between the top and bottom ends of the inner member, the cam members each comprising a flat member having a central portion through which the elongated inner member passes and first and second pairs of opposite sides, the first opposite sides projecting from either side of the central portion so as to engage the slots when the elongated inner member is rotated into a first position, the second opposite sides clearing the elongated parallel walls such that the cams do not engage the slots when the elongated inner member is rotated into a second position.

2. The support leg of claim 1 wherein outer elongated member forms an elongated rectangular tube having opposing parallel walls joined together at the bottom end by attachment to a bottom plate.

3. The support leg of claim 1 wherein the series of slots formed on the parallel walls comprise a plurality of parallel slots formed on each of the parallel walls, the slots on each of the parallel walls being separated from each other by a distance, the slots each extending perpendicularly across the parallel wall in a horizontal orientation such that each of the slots on one of the parallel walls is horizontally aligned with a corresponding slot in the other parallel wall.

4. The support leg of claim 1 further comprising a tubular sleeve dimensioned to fit over and enclose the elongated outer member, the tubular sleeve having an open bottom for receiving the elongated outer member and a top having a cap dimensioned and configured to permit the top end of the elongated inner member to project through the cap.

5. The support leg of claim 1 wherein the elongated inner member is a cylinder having an outer diameter slightly less than a distance separating the parallel walls from each other, the diameter of the upper and lower cams as measured between the first opposite sides is greater than the distance separating the parallel walls from each other, the diameter of the upper and lower cams as measured between the second opposite sides is slightly less than the distance separating the parallel walls from each other.

\* \* \* \* \*